United States Patent
Chen et al.

(10) Patent No.: US 6,671,751 B1
(45) Date of Patent: Dec. 30, 2003

(54) RAID DEVICE FOR ESTABLISHING A DIRECT PASSAGE BETWEEN A HOST COMPUTER AND A HARD DISK BY A DATA HUB SELECTIVELY PASSING ONLY DATA TO BE ACCESSED

(75) Inventors: Shimon Chen, Hsinchu (TW); Chuan Sheng Lin, Hsinchu (TW); Yu-Ting Chiu, Hsinchu (TW); Cheng Wei Yang, Hsinchu (TW)

(73) Assignee: Key Technology Corporation, Hsinchu (TW)

( * ) Notice: Subject to any disclaimer, the term of this patent is extended or adjusted under 35 U.S.C. 154(b) by 0 days.

(21) Appl. No.: 09/548,007

(22) Filed: Apr. 12, 2000

(51) Int. Cl.[7] ............................................. G06F 13/14
(52) U.S. Cl. ........................ 710/36; 710/74; 710/302; 711/114
(58) Field of Search ................. 710/5, 10, 52, 710/74, 302, 8, 15, 7, 36, 38, 62, 72, 300; 711/111–114, 154; 714/6, 7

(56) References Cited

U.S. PATENT DOCUMENTS 5,287,462 A * 2/1994 Jibbe et al. .................. 710/36
5,740,397 A * 4/1998 Levy .......................... 711/114
5,740,465 A * 4/1998 Matsunami et al. ............ 710/5
5,961,652 A * 10/1999 Thompson ..................... 714/6
6,178,520 B1 * 1/2001 DeKoning et al. ............. 714/5

FOREIGN PATENT DOCUMENTS

JP        9-22333        * 1/1997

* cited by examiner

Primary Examiner—Ilwoo Park
(74) Attorney, Agent, or Firm—Rosenberg, Klein & Lee

(57) ABSTRACT

A RAID device has command processing and data transmission adapting ability. The RAID device comprises a RAID controller connected to a host computer through a bus, and a plurality of hard disks. The RAID controller comprises a controller, a selection switch, a command register, a data hub. The controller is connected to all other components of the RAID controller. The controller processes command and regulates channel for data transmission such that the data is directly accessed between CPU and storage disk. The buffer memory is saved and the data can be rebuilt to reduce the risk of computer failure.

7 Claims, 5 Drawing Sheets

RAID DEVICE FOR ESTABLISHING A DIRECT PASSAGE BETWEEN A HOST COMPUTER AND A HARD DISK BY A DATA HUB SELECTIVELY PASSING ONLY DATA TO BE ACCESSED

FIELD OF THE INVENTION

The present invention relates to a RAID (redundant array of inexpensive disk) device, especially to a RAID system with command processing and data transmission adapting ability, whereby the buffer memory is saved and the data of new disk driver can be restored.

BACKGROUND OF THE INVENTION

The prior art RAID system, as shown in FIG. 1, comprises at least a host computer 10, a host bus 12, a RAID controller 14 connected to the host computer 10 through the host bus 12, a plurality of hard disks 160 and 162 connected to the RAID controller 14. The RAID controller 14 comprises at least one functional controller 142 connected to the host bus 12 and a data buffer memory 144 connected to the functional controller 142. The host computer 10 issues request command to hard disks 160 and 162 through the RAID controller 14 for read/write operation. After the hard disks 160 and 162 are ready, the hard disks 160 and 162 send ready command to the host computer 10 through the RAID controller 14. The data to be read or written are temporarily stored in the data buffer memory 144 to reduce transfer delay time and then dispatched to the host computer or the hard disks 160 and 162 according to the regulation of functional controller 142.

The above described RAID system has the advantages of large storage capacity, fault tolerance, fast accessing speed, and automatic data rebuild and backup. However, the functional controller is involved in both read and write operation, the accessing speed is delayed. Moreover, considerable buffer memories are required, the cost of the conventional RAID system is high.

It is an object of the present invention to provide a RAID system with command processing and data transmission adapting ability, wherein a controller is incorporated to process command and regulate channel for data transmission such that the buffer memory is saved and cost is reduced.

It is another object of the present invention to provide a RAID system with command processing and data transmission adapting ability, wherein a data hub and a data processing unit are incorporated to automatically rebuild data with shorted time.

It is still another object of the present invention to provide a RAID system with command processing and data transmission adapting ability, wherein a data processing unit is incorporated to select data storage mode and facilitate the RAID0 and RAID1 architecture.

It is still another object of the present invention to provide a RAID system with command processing and data transmission adapting ability, wherein an OR gate is incorporated to a data processing unit to reduce the risk of transmission error and computer failure.

It is still another object of the present invention to provide a RAID system with command processing and data transmission adapting ability, wherein each hard disk driver is connected to a master hard disk and a slave hard disk such that two corresponding master hard disks form a master mirror RAID system and two corresponding slave hard disks form a slave mirror RAID system.

The various objects and advantages of the present invention will be more readily understood from the following detailed description when read in conjunction with the appended drawing, in which:

DETAILED DESCRIPTION OF THE PREFERRED EMBODIMENT

Figure 1:
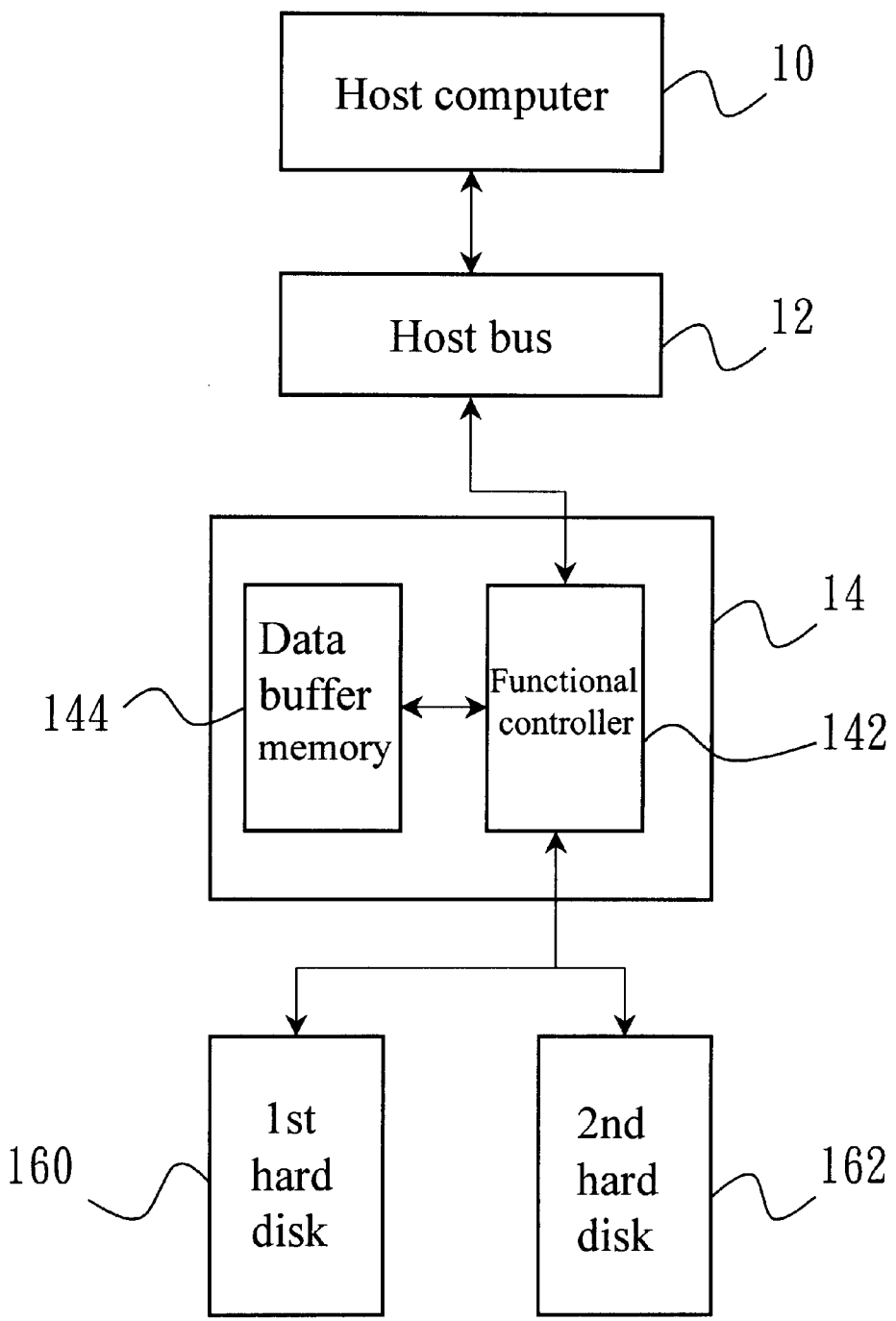
FIG. 1 is the block diagram of a prior art RAID system.
Figure 2:
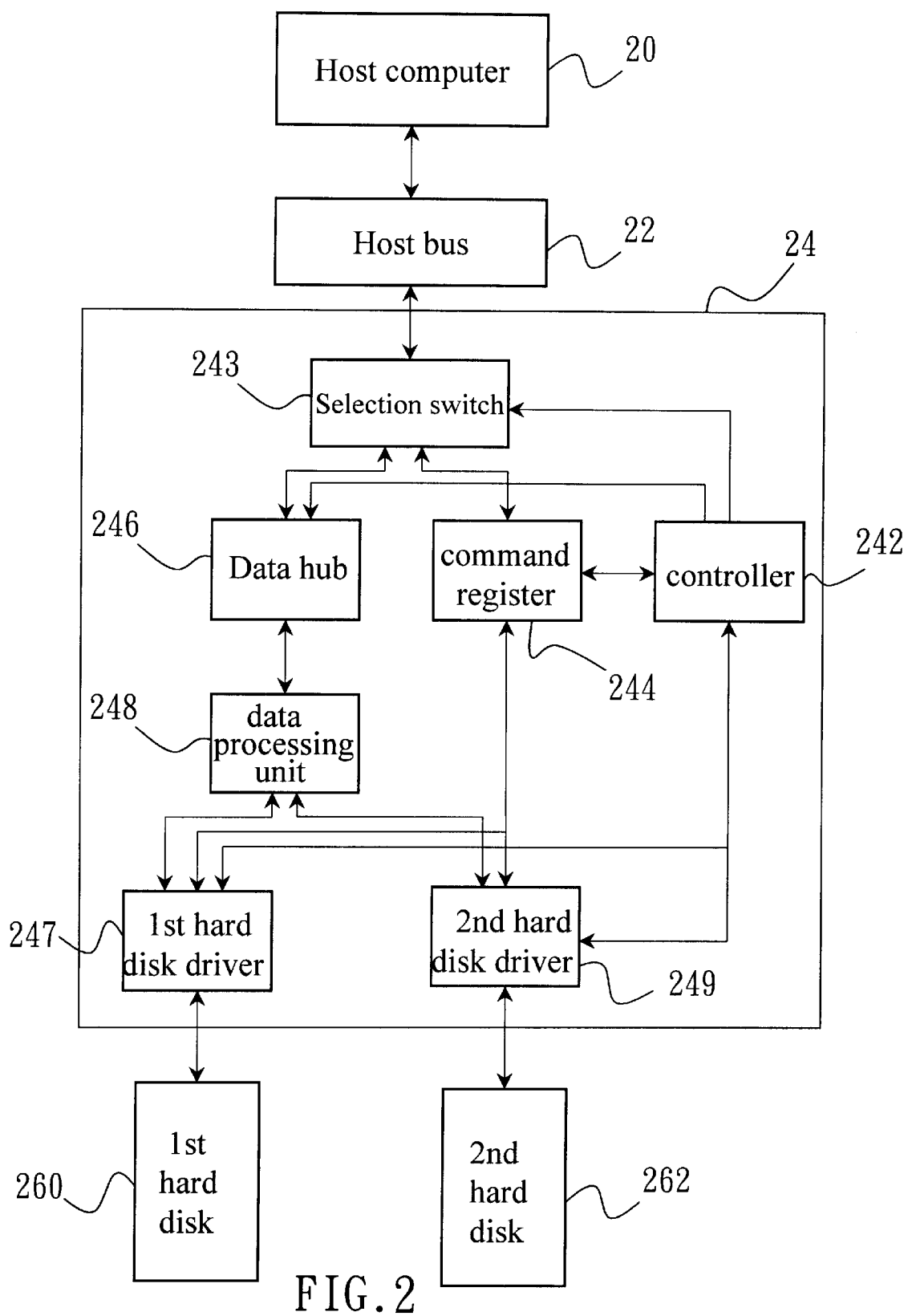
FIG. 2 is the block diagram of a RAID system according to a preferred embodiment of the present invention.

FIG. 2 shows the schematic block diagram of the RAID system according to a preferred embodiment of the present invention. As shown in this figure, the inventive RAID system comprises a host computer 20, a host bus 22, a RAID controller 24, and at least one hard disk. The preferred embodiment is exemplified with two hard disks comprising a first hard disk 260 and a second hard disk 262. The RAID controller 24 comprises at least one command register 244 connected to the bus 22 through a selection switch 243 and functioned only to temporarily store the command issued from the host computer, a data hub 246 connected to the bus 22 through the selection switch 243 and only allowing the transmission of data to be accessed, and at least one hard disk driver. The preferred embodiment is exemplified with two hard disk drivers comprising a first hard disk driver 247 and a second hard disk driver 249, which are connected to the command register 244 and one end of a data processing unit 248. The other end of the data processing unit 248 is connected to the data hub 246 and a controller 242 connected to the selection switch 243, the command register 244, the data hub 246 and the hard disk drivers 247 and 249. The controller 242 is functioned to processing command and data transmission adaptation.

Figure 3:
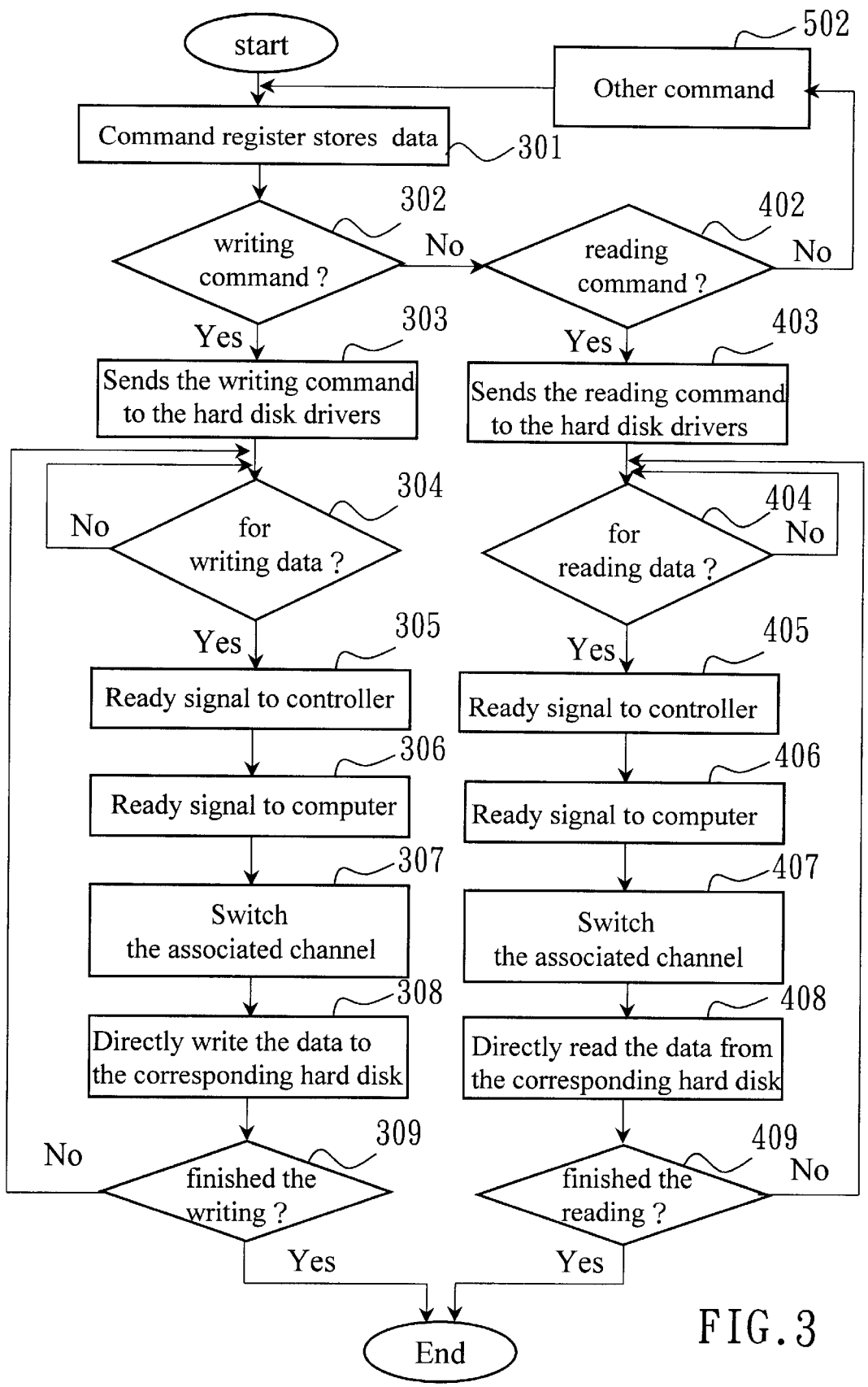
FIG. 3 is the flowchart of data accessing of the RAID system according to a preferred embodiment of the present invention.

FIG. 3 shows the flowchart of the data accessing by the host computer 20 according to a preferred embodiment of the present invention.

Firstly, in step 301, the command register 244 temporarily stores the data accessing command issued from the host computer 20. Afterward, in step 302, the controller 242 reads the data accessing command issued from the command register 244 and judges whether the command is a writing command. If true, the step 303 is executed or the step 402 is executed.

In step 303, the controller 242 judges that the command is writing command and sends the writing command stored in the command register 244 to the hard disk drivers 247 and 249.

In step 304, the hard disk drivers 247 and 249 receive the writing command and seek the address for writing data in the corresponding hard disks 260 and 262.

In step 305, the hard disk drivers 247 and 249 send ready signal to the controller 242 and store the signal to the command register 244.

In step 306, the controller 242 commands the command register 244 to inform the host computer 20 the ready condition of the hard disk drivers 247 and 249.

In step 307, the host computer 20 controls the selection switch 243, and the hard disk drivers 247 and 249 to switch the associated channel to data transmission channel.

In step 308, the host computer 20 directly writes data to the corresponding hard disks 260 and 262 through the bus 22, the selection switch 243, the data hub 246, the data processing unit 248, and the hard disk drivers 247 and 249.

In step 309, the controller 242 detects whether the host computer 20 has finished the writing operation. If true, the process is finished, or the process goes back to the step 304.

In step 402, the controller 242 reads the data accessing command issued from the command register 244 and judges whether the command is a reading command. If true, the step 404 is executed or the step 502 is executed wherein the controller 242 process the non-writing and non-reading command and goes back to the initial state.

The operations in steps 403 to 409 are similar to the operations in steps 303 to 309 except that the writing operation is replaced by addressing seeking operation for the hard disks 260 and 262 to facilitate the reading of the host computer 20. Therefore, the detailed operations are omitted for clarity.

As can be seen from above description, the controller 242 is engaged in early stage of the accessing operation, rather than the whole accessing operation. Moreover, the conventional buffer memory is saved. Therefore, the delay time and cost is reduced.

Moreover, the hard disk drivers 247 and 249 momently monitor the extraordinary conditions of the hard disks 260 and 262 such as damage or hot swap. Once the extraordinary conditions occur, the hard disk drivers 247 and 249 inform the controller 242 to generate alarm such as beep sound, warning message or graphic on RAID system display or on the computer monitor (not shown) and commands the command register 244 to stores extraordinary conditions and inform the host computer 20 later.

The hard disk drivers 247 and 249 momently monitor the extraordinary conditions when a new hard disk is inserted accidentally and inform the controller 242. Afterward, the controller 242 commands the command register 244 to store extraordinary conditions and inform the host computer 20 later. The controller 242 controls the data hub 246 and the data processing unit 248 to auto-rebuild task of the newly-added hard disk and the back up of existing hard disks at proper times such as idle time of CPU, thus ensuring the data integrity of the hard disks.

Figure 4:
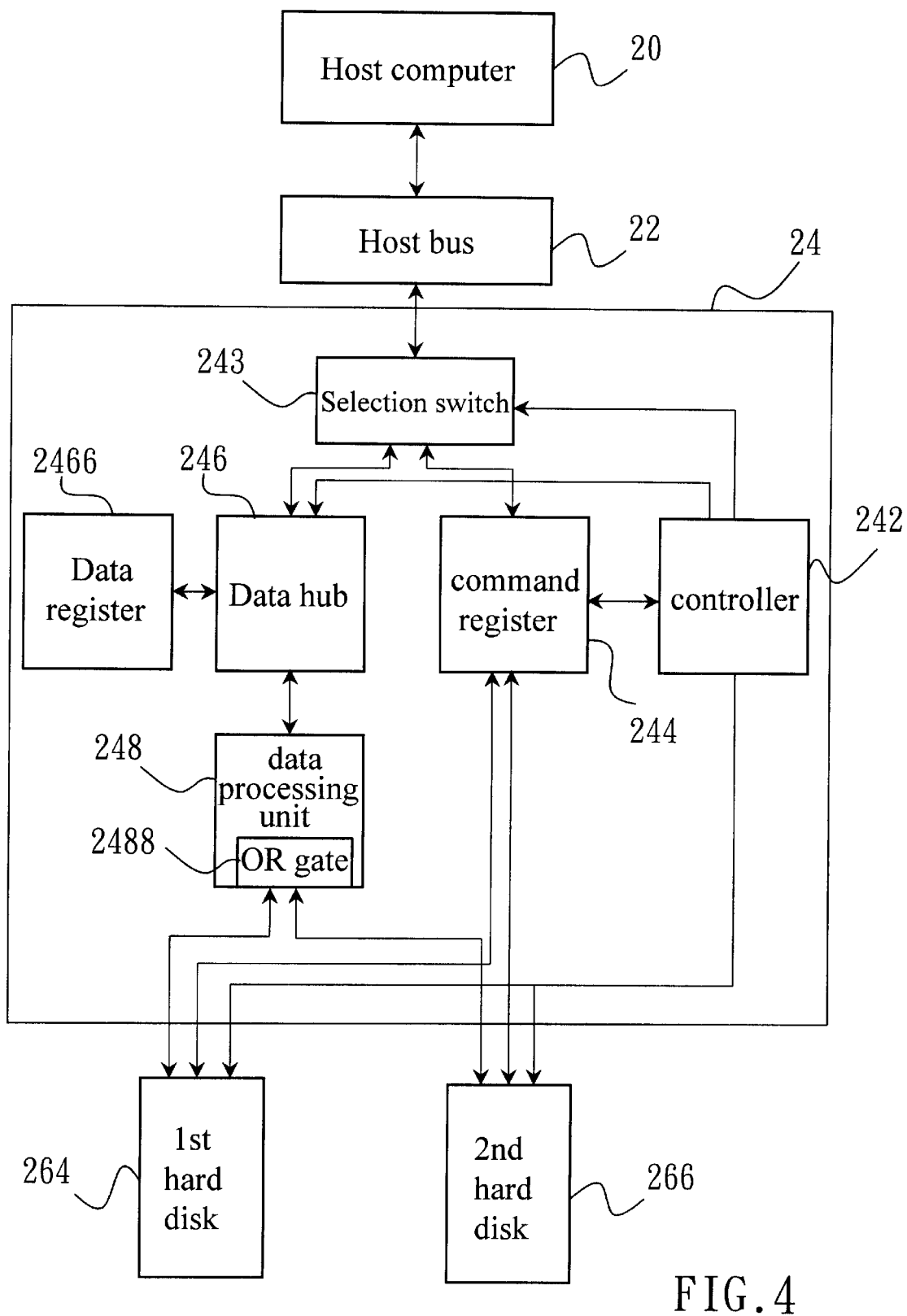
FIG. 4 is the block diagram of a RAID system according to another preferred embodiment of the present invention.

FIG. 4 shows the schematic block diagram of the RAID system according to another preferred embodiment of the present invention. As shown in this figure, the inventive RAID system incorporates an OR gate 2488 in the data processing unit 248 such that the inventive RAID system can take handle the extraordinary conditions of the hard disks 264 and 266 such as damage or hot swap. When one of the hard disks 264 and 266 is failed due to damage or hot swap, the other one of the hard disks 264 and 266 takes charge the data transmission task to ensure normal operation of the inventive RAID system. The hard disk drivers 247 and 249 can be combined with corresponding hard disk devices to form hard disks 264 and 266 with IDE interface, or ISA or PCI interface.

Moreover, the inventive RAID system further comprises a data register 2466 in the data hub 246 to store the ATA command of the ATA identify driver. However, the data register 2466 has far smaller capacity in comparison with conventional buffer memory. Therefore, the cost is not unacceptably increased.

Figure 5:
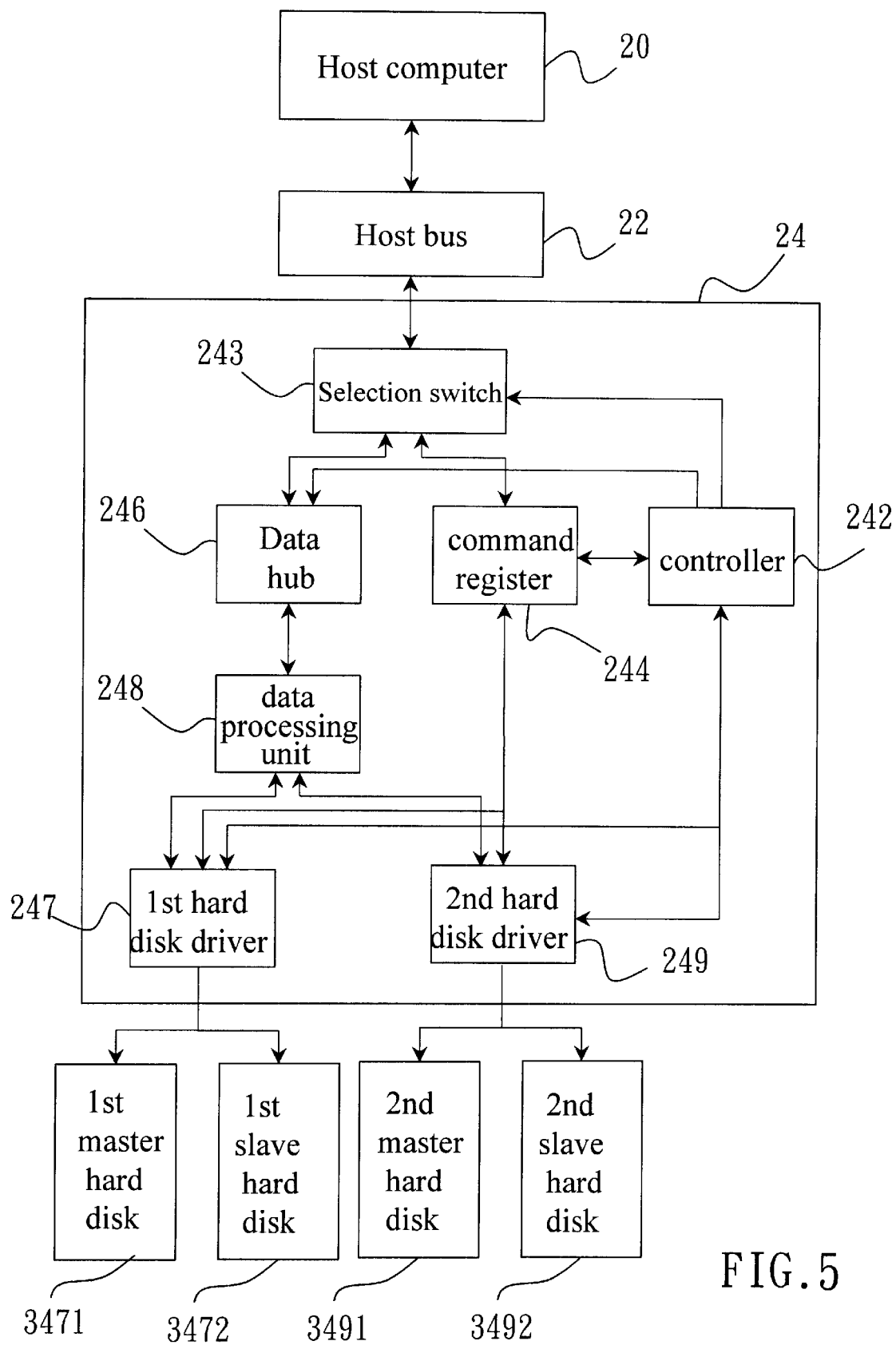
FIG. 5 is the block diagram of a RAID system according to another preferred embodiment of the present invention.

FIG. 5 shows the schematic block diagram of the RAID system according to still another preferred embodiment of the present invention. As shown in this figure, each of the hard disk drivers 247 and 249 is connected to a first master hard disk 3471 and a first slave hard disk 3472, and a second master hard disk 3491 and a second slave hard disk 3492, respectively. The two master hard disks 3471 and 3491 form an IDE master mirror RAID system, and the two slave hard disks 3472 and 3492 form a stand-alone IDE slave mirror RAID system. In other word, the host computer 20 detects only two hard disks. This configuration can also be applied to SCSI interface wherein each of the hard disk drivers 247 and 249 is connected to at most seven hard disks. The hard disks connected to the SCSI bus can be in pair arrangement to form a plurality of SCSI mirror RAID according to the different logic unit on SCSI bus and the at least two hard disk drivers 247 and 249 of the present invention. In other word, two SCSI hard disks of corresponding logic unit connected to the two hard disk drivers can form a SCSI mirror RAID of same logic unit to the host computer. Therefore, the cost is reduced and the data protection and rebuild function of RAID system is reserved.

Moreover, the configuration of the RAID system in the present invention can be various according to user's need. For example, two 3.5-inch hard disks are assembled to form a unit with same size as a 5.25-inch hard disk: or two 2.5-inch hard disks are assembled to form a unit with same size as a 3.5-inch hard disk, wherein the two assembled can be arranged within the reserved slot of computer. Moreover, the number of the hard disk drivers 247 and 249 is not limited to two and the number of the hard disks 260 and 262 can be varied according to user need.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A RAID device with command processing and data transmission adapting ability comprising:

at least one hard disk; and, a RAID controller connected to a host computer through a bus, said RAID controller including at least:

a command register connected to said bus through a selection switch for temporarily storing commands issued from said host computer;

a data hub connected to said bus through said selection switch, said data hub selectively passing only the data to be accessed;

at least one hard disk driver connected to said command register and said data hub, said hard disk driver being coupled to said hard disk; and, a controller connected to said selection switch, said command register, said data hub, and each said hard disk driver for the control thereof in selectively establishing a data transmission channel defined between said host computer and said hard disk for the direct passage of data therebetween; said controller processing said command and regulating channel for data transmission.

2. The RAID device as in claim 1, further comprising a data processing unit arranged between said data hub and each said hard disk driver.

3. The RAID device as in claim 2, further comprising an OR gate connected to each said hard disk driver.

4. The RAID device as in claim 1, further comprising a data register connected to said data hub for retrievably storing identifying information.

5. The RAID device as in claim 1, wherein each said hard disk driver can detect hot swap of a disk drive and inform said controller.

6. The RAID device as in claim 2, wherein said data hub and said data processing unit can transmit data directly from a hard disk drive to another hard disk drive without data buffering means.

7. The RAID device as in claim 1, wherein said selection switch is controlled by said controller to connect to one of said data hub and said command register.

* * * * *